US012725923B2

(12) United States Patent
Singh et al.

(10) Patent No.: US 12,725,923 B2
(45) Date of Patent: Sep. 1, 2026

(54) METASURFACE SUBARRAYS WITH INTEGRATED AMPLIFICATION AND TUNABLE DELAY FOR ESTIMATING ANGLE OF ARRIVAL AND REDIRECTING WIRELESS SIGNALS

(71) Applicant: Dell Products L.P., Round Rock, TX (US)

(72) Inventors: Tejinder Singh, Manotick (CA); Navjot Kaur Khaira, Manotick (CA)

(73) Assignee: Dell Products L.P., Round Rock, TX (US)

(*) Notice: Subject to any disclaimer, the term of this patent is extended or adjusted under 35 U.S.C. 154(b) by 152 days.

(21) Appl. No.: 18/750,710

(22) Filed: Jun. 21, 2024

(65) Prior Publication Data

US 2025/0392044 A1 Dec. 25, 2025

(51) Int. Cl.
*H01Q 3/46* (2006.01)
*G01S 3/04* (2006.01)

(52) U.S. Cl.
CPC ............... *H01Q 3/46* (2013.01); *G01S 3/043* (2013.01)

(58) Field of Classification Search
CPC ......... H01Q 3/46; H01Q 15/002; G01S 3/043
See application file for complete search history.

(56) References Cited

U.S. PATENT DOCUMENTS 6,522,116 B1 2/2003 Jordan
10,211,532 B2 2/2019 Foo
(Continued)

FOREIGN PATENT DOCUMENTS

CN 114976664 A 8/2022
CN 117768269 A 3/2024
WO 2021221603 A1 11/2021

OTHER PUBLICATIONS

Y. Liu, Y. Zhang, X. Zhao, S. Geng, P. Qin and Z. Zhou, "Dynamic-Controlled RIS Assisted Multi-User MISO Downlink System: Joint Beamforming Design," in IEEE Transactions on Green Communications and Networking, vol. 6, No. 2, pp. 1069-1081, Jun. 2022, doi: 10.1109/TGCN.2021.3125676. (Year: 2022).*
(Continued)

*Primary Examiner* — Bernarr E Gregory
(74) *Attorney, Agent, or Firm* — Amin, Turocy & Watson, LLP

(57) ABSTRACT

The technology described herein is directed towards a reconfigurable intelligent surface that receives and redirects incoming electromagnetic signals based on power efficient subarrays of unit cells. Each subarray integrates a power amplifier and tunable delay device to selectively amplify and delay the reflected signal. For example, the power amplifier and tunable delay device is shared by a m×n (e.g., 3×3) subarray of unit cells, which can be arranged as a module of a larger reconfigurable intelligent surface. Proper impedance matching between the power amplifier and the reconfigurable intelligent surface elements is maintained by using a matching circuit to minimize signal reflection. The system design thus provides a device for receiving and reflecting the electromagnetic signal in the same polarization by coupling the RF energy, processing, amplifying, and adding delay to mitigate any interference. The technology facilitates estimation of the angle of arrival of the incoming signal.

20 Claims, 13 Drawing Sheets

(56) References Cited

U.S. PATENT DOCUMENTS

| | | | | |
|---|---|---|---|---|
| 10,770,790 | B1 | 9/2020 | Mahanfar | |
| 10,931,004 | B2 * | 2/2021 | Yoo | H04B 7/0413 |
| 11,133,577 | B2 * | 9/2021 | Wang | H01Q 3/44 |
| 11,329,375 | B1 | 5/2022 | West et al. | |
| 11,855,745 | B2 | 12/2023 | Schloemer | |
| 12,452,047 | B1 | 10/2025 | Wang | |
| 12,519,509 | B2 | 1/2026 | Zuo et al. | |
| 2006/0264173 | A1 | 11/2006 | Gilbert | |
| 2013/0249772 | A1 | 9/2013 | Infante et al. | |
| 2014/0319638 | A1 | 10/2014 | Chia | |
| 2015/0380828 | A1 * | 12/2015 | Black | H01Q 23/00 343/904 |
| 2016/0112117 | A1 | 4/2016 | Platzer et al. | |
| 2018/0062788 | A1 | 3/2018 | Mayer et al. | |
| 2019/0132044 | A1 | 5/2019 | Hreha et al. | |
| 2019/0334228 | A1 | 10/2019 | Haridas et al. | |
| 2021/0013619 | A1 | 1/2021 | Alkhateeb et al. | |
| 2022/0021125 | A1 * | 1/2022 | Baligh | H01Q 21/06 |
| 2022/0026524 | A1 | 1/2022 | Maruyama et al. | |
| 2022/0085918 | A1 | 3/2022 | Luo et al. | |
| 2022/0182116 | A1 | 6/2022 | Raghavan et al. | |
| 2022/0231411 | A1 | 7/2022 | Lin | |
| 2022/0321198 | A1 | 10/2022 | Devoti et al. | |
| 2022/0330273 | A1 | 10/2022 | Kenney et al. | |
| 2022/0337240 | A1 * | 10/2022 | Venkatesh | H01Q 15/148 |
| 2023/0099471 | A1 | 3/2023 | Pascucci et al. | |
| 2023/0101393 | A1 | 3/2023 | Dai et al. | |
| 2023/0142735 | A1 | 5/2023 | Raghavan et al. | |
| 2023/0188170 | A1 | 6/2023 | Dutta et al. | |
| 2023/0254135 | A1 | 8/2023 | Lyons et al. | |
| 2023/0318818 | A1 | 10/2023 | Sinha et al. | |
| 2023/0319507 | A1 | 10/2023 | Gummadi et al. | |
| 2023/0403661 | A1 | 12/2023 | Kim et al. | |
| 2023/0413203 | A1 | 12/2023 | Ryu et al. | |
| 2024/0014862 | A1 | 1/2024 | Duan et al. | |
| 2024/0080184 | A1 | 3/2024 | Yoshino et al. | |
| 2024/0171447 | A1 * | 5/2024 | Hemadeh | H04L 27/36 |
| 2024/0204998 | A1 | 6/2024 | Yeomans et al. | |
| 2024/0259087 | A1 | 8/2024 | Corey et al. | |
| 2024/0333398 | A1 | 10/2024 | Bush | |
| 2024/0364019 | A1 | 10/2024 | Hussain | |
| 2024/0378930 | A1 | 11/2024 | Motos et al. | |
| 2024/0388361 | A1 | 11/2024 | Duan et al. | |
| 2024/0419404 | A1 | 12/2024 | Burchard et al. | |
| 2024/0429969 | A1 | 12/2024 | Hong et al. | |
| 2025/0062529 | A1 | 2/2025 | Nathan et al. | |
| 2025/0125525 | A1 | 4/2025 | Rossanese et al. | |
| 2025/0175217 | A1 | 5/2025 | Albanese et al. | |
| 2025/0274165 | A1 | 8/2025 | Manolakos et al. | |
| 2025/0343577 | A1 | 11/2025 | Abu Al Haija et al. | |
| 2025/0373340 | A1 | 12/2025 | Abelson et al. | |
| 2026/0046613 | A1 | 2/2026 | Elshafie et al. | |

OTHER PUBLICATIONS

Healy, et al. "Layer-1 Physical Interface Transcoder Leveraging Metasurfaces" U.S. Appl. No. 18/899,886, filed Sep. 27, 2024, 63 pages.

Healy, et al. "Connecting Wi-Fi-Enabled Device to Non-Terrestrial Satellite Constellations" U.S. Appl. No. 18/899,909, filed Sep. 27, 2024, 55 pages.

Khaira, et al. "Layer-1 Physical Interface Transcoder With Signal Processing Capabilities to Support Hybrid Terrestrial and Non-Terrestrial Ground and Space Mesh Network" U.S. Appl. No. 18/902,052, filed Sep. 30, 2024,79 pages.

Healy, et al. "Universal Layer-1 Physical Interface Transcoder for Terrestrial and Non-Terrestrial Air-Interfaces" U.S. Appl. No. 18/899,739, filed Sep. 27, 2024, 62 pages.

Singh, et al. "Metasurface Integrated Non-Terrestrial Network Transcoder With Adaptive Slicing for Dynamic Allocation of Mesh Resources" U.S. Appl. No. 18/902,100, filed Sep. 30, 2024, 64 pages.

Singh, et al. "Edge Computing and Metasurfaces in Non-Terrestrial Network-Connected Transcoder Nodes" U.S. Appl. No. 18/902,158, filed Sep. 30, 2024, 66 pages.

Healy, et al. "High-Availability Communication Link That Supports Terrestrial and Non-Terrestrial Networks Including for Disaster-Relief and Emergency Management Services" U.S. Appl. No. 18/902,268, filed Sep. 30, 2024, 75 pages.

Singh, et al. "Allocating Primary and Secondary Metasurface Integrated Non-Terrestrial Network Transcoder Nodes" U.S. Appl. No. 18/902,360, filed Sep. 30, 2024, 64 pages.

Healy, et al. "Model-Controlled Layer-1 Physical Interface Transcoder to Support Hybrid Terrestrial and Non-Terrestrial Ground and Space Mesh Network" U.S. Appl. No. 18/899,504, filed Sep. 27, 2024, 64 pages.

Khaira, et al. "Enhancing Network Resiliency and Performance Through Multipath Routing With Metasurface-Integrated Portable Transcoder" U.S. Appl. No. 18/902,395, filed Sep. 30, 2024, 50 pages.

Singh, et al. "Secure Non-Terrestrial Network Links Utilizing Quantum Key Distribution Integrated Into a Metasurface Transcoder Node With Hardware Polarization Control" U. S. U.S. Appl. No. 18/902,422, filed Sep. 30, 2024, 37 pages.

Singh, et al. "Signal Correction Based on Environmental Factors in Metasurfaces for Non-Terrestrial Network Transcoder Nodes" U.S. Appl. No. 18/902,454, filed Sep. 30, 2024, 53 pages.

Khaira, et al. "Energy-Efficient Active Reconfigurable Intelligent Surface With Integrated Sub-Array Power Amplifiers and Signal Coupling" U.S. Appl. No. 18/586,838, filed Feb. 26, 2024, 33 pages.

Khaira, et al. "Energy-Efficient Active Reconfigurable Intelligent Surface With Selective Amplification" U.S. Appl. No. 18/609,134, filed Mar. 19, 2024, 39 pages.

Singh, et al. "Reconfigurable Intelligent Surface Integrated on Compact Drones for Wireless Network Survey" U.S. Appl. No. 18/913,434, filed Oct. 11, 2024, 36 pages.

Singh, et al. "Real-Time Data Management and Integrity Assurance for Artificial Intelligence-Driven Millimeter Wave Advanced Metasurfaces" U.S. Appl. No. 18/656,407, filed May 6, 2024, 44 pages.

Singh, et al. "Reconfigurable Intelligent Surfaces That Self Heal and Adapt by Altering the Tile Geometry" U.S. Appl. No. 18/656,431, filed May 6, 2024, 74 pages.

Singh, et al. "Predictive Signal Boosting in Distributed Tile Controllers for Reconfigurable Metasurfaces" U.S. Appl. No. 18/656,441, filed May 6, 2024, 54 pages.

Ye, et al. "Enhancing Non-Terrestrial Network Direct-To-Everything Service With Metasurfaces" U.S. Appl. No. 18/739,880, filed Jun. 11, 2024, 39 pages.

Healy, et al. "Transcoding the Air-Interface Between Non-Terrestrial and Terrestrial Networks Leveraging Integrated Transcoder and Metasurface Mounted on a Drone" U.S. Appl. No. 18/780,254, filed Jul. 22, 2024, 61 pages.

Healy, et al. "Communication Between Non-Terrestrial and Terrestrial Networks Based on Layer-1 Physical Packet-Level Transcoding" U.S. Appl. No. 18/780,269, filed Jul. 22, 2024, 59 pages.

Singh, et al. "Reconfigurable Intelligent Surface With Variable Amplification and Attenuation Including Angle of Arrival Estimation of Wireless Signals" U.S. Appl. No. 18/797,975, filed Aug. 8, 2024, 46 pages.

Notice of Allowance received for U.S. Appl. No. 18/609,134 dated Sep. 16, 2025, 11 pages.

Non-Final Office Action received for U.S. Appl. No. 18/656,441 dated Sep. 22, 2025, 7 pages.

Notice of Allowance received for U.S. Appl. No. 18/656,441 dated Nov. 19, 2025, 5 pages.

Notice of Allowance received for U.S. Appl. No. 18/739,880 dated Nov. 12, 2025, 10 pages.

Notice of Allowance received for U.S. Appl. No. 18/797,975 dated Sep. 19, 2025, 9 pages.

qorvo.com, "CMD262 26-28 GHz (Ka Band) GaN Power Amplifier", Rev-A, URL—https://www.qorvo.com/products/p/CMD262, Jun. 14, 2022, 1 page.

(56) References Cited

OTHER PUBLICATIONS

Ndjiongue et al., "Re-Configurable Intelligent Surface-Based VLC Receivers Using Tunable Liquid-Crystals: The Concept", Journal of Lightwave Technology, vol. 39, No. 10, May 15, 2021, pp. 3193-3200.
Long et al., "Active Reconfigurable Intelligent Surface Aided Wireless Communications", IEEE Transactions on Wireless Communications, vol. 20, No. 8, Aug. 2021, pp. 4962-4975.
Hu et al., "Design of a Novel 2-bit Wideband Beam-Scanning Reconfigurable Intelligent Surface", IEEE International Workshop on Electromagnetics: Applications and Student Innovation Competition, 2021, pp. 1-3.
Gros et al., "A Reconfigurable Intelligent Surface at mmWave Based on a Binary Phase Tunable Metasurface", IEEE Open Journal of the Communications Society, vol. 2, 2021, pp. 1055-1064.
Sievenpiper et al., "Two-dimensional Beam Steering Using an Electrically Tunable Impedance Surface", IEEE Transactions on Antennas and Propagation, vol. 51, No. 10, Oct. 2003, pp. 2713-2722.
Guclu et al., "Proof of Concept of a Dual-band Circularly-polarized Rf Mems Beam-switching Reflectarray", IEEE Transactions on Antennas and Propagation, vol. 60, No. 11, Nov. 2012, pp. 5451-5455.
Meng et al., "The Design and Analysis of Electronically Reconfigurable Liquid Crystal-Based Reflectarray Metasurface for 6G Beamforming, Beamsteering, and Beamsplitting", IEEE Access, vol. 4, 2016, 12 pages.
Ojaroudi et al., "Graphene-Based Reconfigurable Intelligent Meta-Surface Structure for THz Communications", 15th European Conference on Antennas and Propagation, 2021, 5 pages.
Tasci et al., "A New RIS Architecture With a Single Power Amplifier: Energy Efficiency and Error Performance Analysis", IEEE Access, Apr. 2022, 11 pages.
Bai et al., "RIS-Assisted Green Secure Communications: Active RIS or Passive Ris?", IEEE Wireless Communications Letters, Dec. 6, 2022, 5 pages.
Goldman et al., "SpaceX and T-mobile Focus on Direct Satellite-to-Smartphone to Improve Mobile Coverage in Remote Areas", Analysys Mason, Aug. 2022, 5 pages.
Jewett, Rachel, "How Big is the Satellite Industry's Direct-to-Device Opportunity?", via Satellite, Sep. 12, 2023, Url—https://www.satellitetoday.com/connectivity/2023/09/12/how-big-is-the-satellite-industrys-direct-to-device-opportunity/, Retrieved from the internet Dec. 2, 2024, 4 pages.
"Electromagnetic Metasurface", Wikipedia, URL—https://en.wikipedia.org/wiki/Electromagnetic_metasurface#, Retrieved from the internet Dec. 2, 2024, 9 pages.
Schweber, Bill., "The Doppler Effect: From Highly Ridiculed to Absolutely Indispensable, Part 1", Electrical Engineering News and Products, Apr. 19, 2022, URL—https://www.eeworldonline.com/the-doppler-effect-from-highly-ridiculed-to-absolutely-indispensable-part-1/, Retrieved from the internet Dec. 2, 2024, 14 pages.
"Doppler Effect", Wikipedia, URL—https://en.wikipedia.org/wiki/Doppler_effect, Retrieved from the internet Dec. 2, 2024, 8 pages.
Long et al., "A Promising Technology for 6G Wireless Networks: Intelligent Reflecting Surface", Journal of Communications and Information Networks, vol. 6, No. 1, Mar. 2021, 16 pages.
Singh et al., "Recent Advancements in Reconfigurable mmWave Devices Based on Phase-Change and Metal Insulator Transition Materials", IEEE Journal of Microwaves, vol. 3, No. 2, Apr. 2023, pp. 827-851.
Rodrigues et al., "Efficient Power Allocation Strategies in Hybrid Active-Passive Reconfigurable Intelligent Surfaces", IEEE Communications Letters, vol. 28, No. 1, Jan. 2024, pp. 113-117.
Rodrigues et al., "Optimized Phase Shifts in Intelligent Reflective Surfaces for Robust Radar-based Indoor Coverage Enhancement", Proceedings of the SPIE, Radar Sensor Technology XXVII, vol. 12535, 2023. pp. 64-76.
3GPP TR 23.737 V17.0.0, "3rd Generation Partnership Project; Technical Specification Group Services and System Aspects; Study on architecture aspects for using satellite access in 5G, (Release 17)", Dec. 2019, 82 pages.
3GPP TR 28.808 V17.0.0, "3rd Generation Partnership Project; Technical Specification Group Services and System Aspects Study on Management and Orchestration Aspects of Integrated Satellite Components in a 5G Network, (Release 17)", Mar. 2021, 30 pages.
3GPP TS 38.108 V17.0.0, 3rd Generation Partnership Project; Technical Specification Group Radio Access Network; NR; Satellite Access Node radio transmission and reception, (Release 17), Jun. 2022, 58 pages.
"DVB", Wikipedia, URL—https://en.wikipedia.org/wiki/DVB, Retrieved from the internet Dec. 2, 2024, 12 pages.
"DVB-S", Wikipedia, URL—https://en.wikipedia.org/wiki/DVB-S, Retrieved from the internet Dec. 2, 2024, 2 pages.
"DVB-S2", Wikipedia, URL—https://en.wikipedia.org/wiki/DVB-S2, Retrieved from the internet Dec. 2, 2024, 7 pages.
"DVB-S2X", Wikipedia, URL—https://en.wikipedia.org/wiki/DVB-S2X, Retrieved from the internet Dec. 2, 2024, 2 pages.
The Ad Hoc Group., "White Paper on the use of DVB-S2X for DTH Applications, DSNG & Professional Services, Broadband Interactive Services and VL-SNR applications", Digital Video Broadcasting, Mar. 2015, 16 pages.
DVB Org., "Implementation Guidelines for the Second Generation System for Broadcasting, Interactive Services, News Gathering and Other Broadband Satellite Applications; Part 2: S2 Extensions (DVB-S2X)", ETSI TR 102 376-2 V1.2.1, Jan. 2021, 212 pages.
DVB Org., "Second Generation Framing Structure, Channel Coding and Modulation Systems for Broadcasting, Interactive Services, News Gathering and Other Broadband Satellite Applications; Part 2: DVB-S2 Extensions (DVB-S2X)", Dvb Document A083-2 Rev.4, Feb. 2024, 166 pages.
"Facts and Figures 2022—Mobile Network Coverage 2022", ITU, URL—https://www.itu.int/itu-d/reports/statistics/2022/11/24/ff22-mobile-network-coverage/, Retrieved from the internet Dec. 2, 2024, 4 pages.
Kenfack et al., "Modeling of a DVB-S2 Transmission Chain with Optimization of Adjustment Parameters for a Good Quality of the Reception Signal", International Journal of Communications, Network and System Sciences, vol. 16, Jan. 31, 2023, pp. 1-20.
ETSI EN 300 421 V1.1.2, "Digital Video Broadcasting (DVB); Framing Structure, Channel Coding and Modulation for 11/12 Ghz Satellite Services", Aug. 1997, 24 pages.
ETSI EN 302 307-1 V1.4.1, "Digital Video Broadcasting (DVB); Second Generation Framing Structure, Channel Coding and Modulation Systems for Broadcasting, Interactive Services, News Gathering and Other Broadband Satellite Applications; Part 1: DVB-S2", Jul. 2014, 80 pages.
ETSI EN 302 307 V1.2.1, Digital Video Broadcasting (DVB); Second Generation Framing Structure, Channel Coding and Modulation Systems for Broadcasting, Interactive Services, News Gathering and Other Broadband Satellite Applications (DVB-S2), Aug. 2009, 78 pages.
ETSI TR 102 376-1 V1.2.1, "Digital Video Broadcasting (DVB); Implementation Guidelines for the Second Generation System For Broadcasting, Interactive Services, News Gathering and other Broadband Satellite Applications; Part 1: DVB-S2", Nov. 2015, 118 pages.
ETSI TR 102 376-2 V1.2.1, "Digital Video Broadcasting (DVB); Implementation Guidelines for the Second Generation System for Broadcasting, Interactive Services, News Gathering and other Broadband Satellite Applications; Part 2: S2 Extensions (DVB-S2X)", Jan. 2021, 212 pages.
Lee et al., "Integrated DVB-X2 Receiver Architecture with Common Acceleration Engine", Applied Sciences, vol. 9, No. 3983, Sep. 23, 2019, 16 pages.
Nemer, Elias., "Physical Layer Impairments in DVB-S2 Receivers", Second IEEE Consumer Communications and Networking Conference, 2005, pp. 487-492.

(56) References Cited

OTHER PUBLICATIONS

DVB Org., "White Paper on the use of DVB-S2X for DTH applications, DSNG & Professional Services, Broadband Interactive Services and VL-SNR applications", DVB Document A172, Mar. 2015, 16 pages.
Babcock, Stephen., "AT&T Invested $450M in Maryland Network Upgrades Over 3 Years", Technical.ly, URL—https://technical.ly/startups/att-invested-450m-in-maryland-network-upgrades-over-3-years/, Jul. 9, 2019, Retrieved from the internet Dec. 2, 2024, 7 pages.
Tyree et al., "AT&T Providing Cell on Wheels to Help with Internet Connection at LU's Graduation", URL- https://wset.com/news/local/att-providing-cell-on-wheels-to-help-with-internet-connection-at-lus-graduation, May 10, 2017, Retrieved from the internet Dec. 2, 2024, 6 pages.
ITU, "H.222.0 : Information Technology-Generic Coding of Moving Pictures and Associated Audio Information: Systems", International Telecom Union, Aug. 2018, 306 pages.
Cioni et al., "DVB-S2X Physical Layer Performance Results Over Realistic Channel Models", International Journal of Satellite Communications and Networking, vol. 34, No. 3, Jul. 2015, 21 pages.
"MPEG Transport Stream", Wikipedia, URL—https://en.wikipedia.org/wiki/MPEG_transport_stream, Retrieved from the internet Dec. 2, 2024, 10 pages.
Keese, Col. John E., "Satellite Telemetry, Tracking and Control Subsystems", Massachusetts Institute of Technology, Oct. 29, 2003, 35 pages.
NASA, "State-of-the-Art of Small Spacecraft Technology", NASA 9.0 Communications, Feb. 12, 2024, 32 pages.
Stuhlfauth, Reiner. "5G NTN Takes Flight: Technical Overview of 5G Non-Terrestrial Networks", Rohde & Schwarz, White Paper, Version 01.00, 2022, 124 pages.
Dhaou, Riadh. "Modeling of Networks Composed of Satellite Constellations" University of Paris VI Dissertation, Nov. 8, 2002 [https://www.researchgate.net publication/265231818_MODELING_OF_NETWORKS_COMPOSED_OF_SATELLITE_CONSTELLATIONS], 225 pages.
"Aerial SDK Layer 1" NVIDIA Docs Hub, https://docs.nvidia.com/aerial/archive/aerial-sdk/23-1/text/product_brief/aerial_sdk_layer_1.html] retrieved Jan. 16, 2025, 30 pages.
Notice of Allowance received for U.S. Appl. No. 18/902,100 dated Mar. 10, 2026, 9 pages.
Notice of Allowance received for U.S. Appl. No. 18/656,407 dated Mar. 19, 2026, 11 pages.
Notice of Allowance received for U.S. Appl. No. 18/902,422 dated May 7, 2026, 16 pages.
Liu et al., "Single-Photon Generation and Manipulation in Quantum Nanophotonics", Applied Physics Reviews, vol. 12, Article No. 011308, Jan. 24, 2025, 38 pages.
Sund et al., "Processing Single-Photons from a Quantum Dot Using High-Speed Integrated Photonic Circuits on the Thin Film Lithium-Niobate-on-Insulator Platform", 2023 Conference on Lasers and Electro-Optics (CLEO), 2023, 2 pages.
Silverstone et al., "Monolithic Generation and Manipulation of Nondegenerate Photon Pairs within a Silicon-on- Insulator Quantum Photonic Circuit", 2013 Conference on Lasers & Electro-Optics Europe & International Quantum Electronics Conference Cleo Europe/Iqec, 2013, 1 page.
Non-Final Office Action received for U.S. Appl. No. 18/780,254 dated May 29, 2026, 17 pages.
Non-Final Office Action received for U.S. Appl. No. 18/780,269 dated May 29, 2026, 16 pages.
Office Action mailed Jun. 26, 2026 for U.S. Appl. No. 18/586,838, 72 pages.
Final Office Action mailed Jul. 14, 2026 for U.S. Appl. No. 18/780,254, 47 pages.
Notice of Allowance mailed Jul. 7, 2026 for U.S. Appl. No. 18/780,269, 40 pages.

* cited by examiner

342

318

METASURFACE SUBARRAYS WITH INTEGRATED AMPLIFICATION AND TUNABLE DELAY FOR ESTIMATING ANGLE OF ARRIVAL AND REDIRECTING WIRELESS SIGNALS

BACKGROUND

Reconfigurable intelligent surfaces (alternatively referred to as intelligent reflective surfaces, or metasurfaces) are man-made thin reflective or refractive surfaces whose electromagnetic response can be electronically controlled. Reconfigurable intelligent surfaces are characterized by their two-dimensional arrays of electronically controllable reflecting elements that can dynamically manipulate electromagnetic waves by altering attributes such as phase, amplitude, and direction of the incoming signal. Because of their ability to alter the attributes of signals reflected at the surface, intelligent reflective surfaces are being evaluated for use in beyond fifth generation (B5G) and sixth generation (6G) wireless communication and wireless sensing networks.

In communications assisted by a reconfigurable intelligent surface, signal strength at the receiver is significantly constrained by the distance the signal needs to travel. Increasing the size of the reconfigurable intelligent surface is a common method to counteract free-space signal loss, but this can be costly and energy-intensive.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
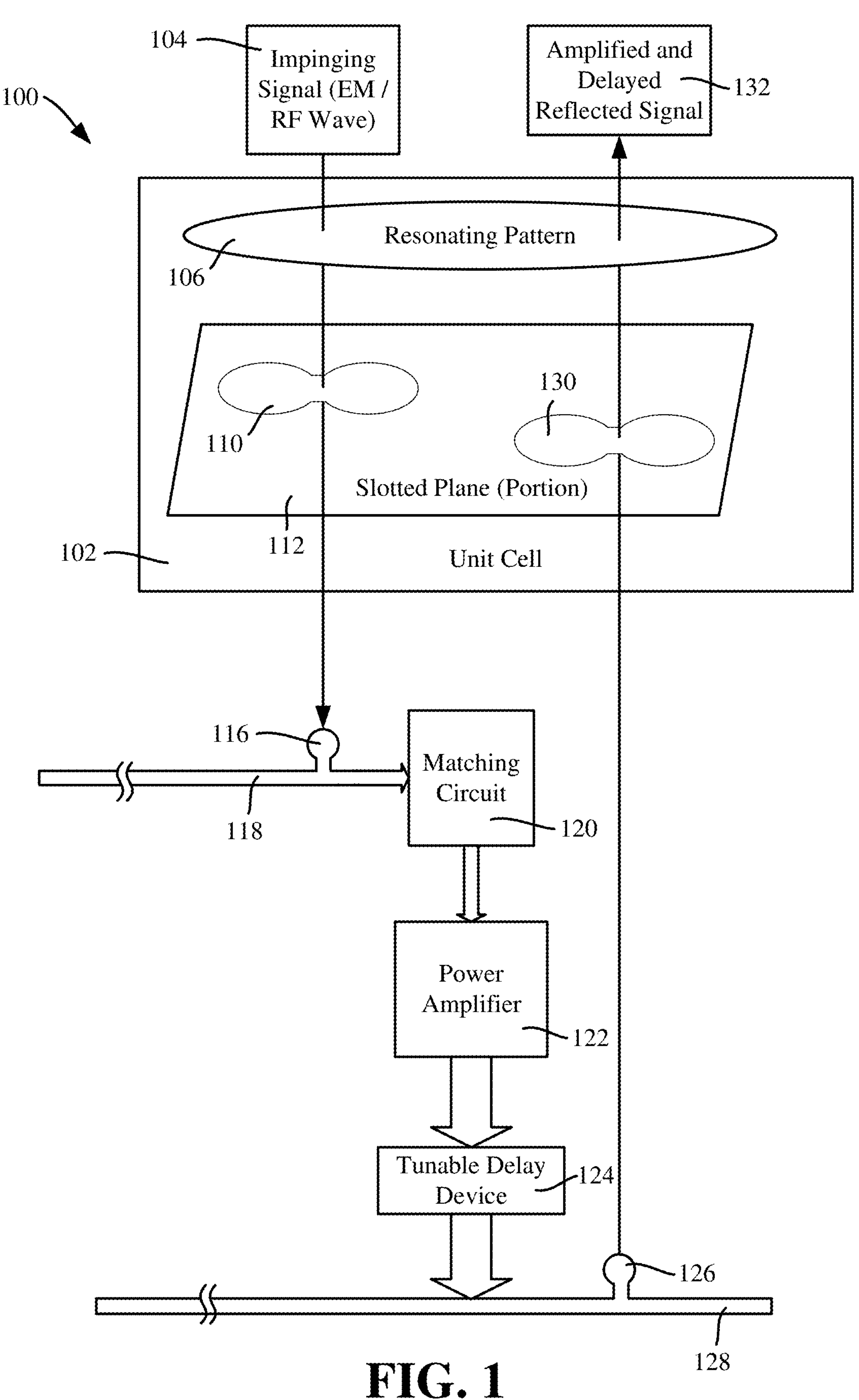
FIG. 1 is an example conceptual block diagram showing a system including a unit cell of a reconfigurable intelligent surface for reflecting an incoming signal as a selectively amplified and/or delayed instance of the incoming signal, in accordance with various example embodiments and implementations of the subject disclosure.

The technology described herein is generally directed towards integrating power amplifiers and tunable delay circuitry with reconfigurable intelligent surfaces. In one example implementation, power amplifiers and a switch-based tunable delay device are surface mounted onto components (reconfigurable intelligent surface elements) of a reconfigurable intelligent surface, e.g., during the fabrication process.

In one implementation, the technology described herein integrates a tunable delay and a power amplifier to an m×n subarray of unit cells (e.g., 3×3). During manufacturing, these components can be surface mounted onto the subarrays, providing signal amplification. This hardware-based approach receives the incoming signal, couples the signal for processing, estimates the angle of arrival (AoA) of the signal, boosts the signal, and transmits the signal with a controlled amount of desired delay to mitigate or minimize any potential interference. In one approach, the estimation of the AoA and the coupling of the signal for processing does not require any power, whereby this part is thus passive; only the signal boosters and tunable delay consume a relatively small amount of power. It will be understood that the amount of power consumed is at the subarray level, rather than at each unit cell-level. The subarray concept results in a reduction (e.g., ninefold for a 3×3 subarray) with respect to lower costs, reduced power consumption, minimized heat dissipation, lesser signal distortion, and more manageable interference.

For example, because power amplifiers can consume significant power, the technology described herein facilitates balancing the amplification needs with power efficiency to ensure the system does not consume excessive energy, including in large-scale deployments. More particularly, to avoid the high cost and power demands of outfitting each reconfigurable intelligent surface element with a power amplifier, a more efficient approach is adopted by integrating a power amplifier and tunable delay device with every m×n (e.g., 3×3) subarray (subgroup) of elements (unit cells). Proper impedance matching between the power amplifiers and the reconfigurable intelligent surface elements is maintained by using a matching circuit to minimize signal reflection.

In one or more example implementations, reconfigurable intelligent surface elements (unit cells) with concentric ring-shaped metallic patterns can be used; notwithstanding, any arbitrary shape can be used, provided that the elements resonate at the desired wireless communication frequency. Further, in one or more example implementations, to get a wide bandwidth response, two hourglass-shaped slots are used to passively couple the RF energy from the incoming signal (receive slots) and then transmit the outgoing delayed and/or amplified signal via coupled RF energy through the transmitting slots; notwithstanding, any arbitrary slot shape can be used, as long as it corresponds to the resonating frequency.

The technology described herein estimates the angle of arrival of an incoming signal with a low-cost planar manufacturing approach utilizing static couplers beneath each unit-cell. This facilitates receiving an electromagnetic signal and reflecting a processed instance of the wireless signal without changing the signal polarization, by amplifying and adding tunable delay. The hardware design approach significantly reduces the hardware costs, interference, power consumption and heat dissipation in metasurfaces. Note that the delay can be added before the amplification or after the amplification, a with provision to change the direction of amplifier's input/output and matching circuit.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in communications and computing in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. For example, "optimal" placement of a subnet means selecting a more optimal subnet over another option, rather than necessarily achieving an optimal result. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 is a conceptual depiction of an example system 100 including a unit cell 102 that redirects (reflects or refracts) an impinging (incoming) signal 104, (an electromagnetic (EM)/radio frequency (RF) wave, such as near or within the millimeter wavelength, e.g., above 25 gigahertz). A metallic resonating pattern 106 (e.g., a concentric ring-shaped metallic pattern) resonates at a frequency that corresponds to the frequency of the incoming signal. As set forth herein, a unit cell 102 can have a resonating pattern 106 of any suitable shape (e.g., square, rectangular and so on) that resonates at a corresponding frequency of the incoming signal, and is thus not limited to concentric ring patterns, nor limited to millimeter wave frequencies.

A first opening 110 (e.g., an hourglass-shaped opening) in a slotted plane 112 beneath and electrically insulated from the metallic resonating pattern 106 passes (e.g., couple/transfers) the signal 106 to a contact/terminal 116 of a first microstrip line 118 that is beneath and electrically insulated from the slotted plane 112. The slotted plane, which blocks the incoming RF signal (except via the opening 110) can be divided into electrically separated portions, e.g., one per unit cell, to help mitigate potential interference with respect to other unit cells. As set forth herein, a unit cell 102 can have an opening 110 of any suitable shape and size that passes the corresponding frequency of the incoming signal 104, and is thus not limited to hourglass-shaped openings.

The first microstrip line 118, which acts as a combining circuit, is coupled via an impedance matching circuit 120 to a power amplifier 122 such that the incoming signal passed to the terminal 118 can be controllably amplified and delayed as described herein. The output of the amplifier is coupled to a tunable delay device 124 that selectively delays the amplified signal, with at least some delay because of the length of a selected one of delay lines therein. The delayed, amplified signal thus can be of the same polarization as the incoming signal, because the delay mitigates interference between the incoming signal and the amplified signal to be output. However, the delay also can be selectively increased or decreased as needed, such as to further mitigate interference, to prevent an unauthorized eavesdropper from comprehending information from the reflected signal, and so on.

In this example, the tunable delay device 124 electrically couples the selectively amplified (and delayed) signal to a contact/terminal 126 of a second microstrip line 128, which acts as a dividing circuit. Via the contact/terminal 126, the amplified and delayed signal is passed (RF coupled) through a second opening 130 (e.g., an hourglass-shaped opening) in the slotted plane 112, by which the amplified and delayed signal reaches the resonating pattern 106, resulting in an amplified and delayed redirected (e.g., reflected) signal 132.

As will be understood, the matching circuit 120, power amplifier 122 and tunable delay device 124 are shared, via the first microstrip line 118 and the second microstrip line 128, with one or more other unit cells. This reduces the high energy cost associated with each power amplifier. For example, a 3×3 subarray (subgroup) of unit cells based on the shared power amplifier design described herein results in only one amplifier for each subarray of nine unit cells, or one-ninth of the energy consumed by having a power amplifier per unit cell. As can be readily appreciated, instead of the 3×3 subarray used in the examples herein, other subarrays can be used, e.g., 2×2, 4×4, 5×5 and so on, depending on the tradeoff between power usage and the strength of the amplified reflected signal. Moreover, a non-symmetrical subgroup/subarray can be used, e.g., 3×4, 3×5 and so on; however symmetrical subgroups having the same number of unit cells in each dimension (m=n) helps facilitate modular design, as does having a reconfigurable intelligent surface made of same-sized subarrays, which also keeps design computations straightforward. The gain can be increased by less elements per amplifier, while the reflected beam is narrowed by more elements per amplifier; the cost versus elements per module/amplifier is a tradeoff that can be matched to a particular scenario where a reconfigurable intelligent surface is desired.

Thus, a significant enhancement to reconfigurable intelligent surface technology is described herein by the integration of power amplifiers and tunable delay circuitry. During the fabrication process, the power amplifiers can be surface mounted onto reconfigurable intelligent surface. To avoid the high cost and power demands of outfitting each reconfigurable intelligent surface element (unit cell) with a power amplifier, described herein is integrating a power amplifier with every m×n cluster of elements. Proper impedance matching between the power amplifiers and the reconfigurable intelligent surface elements is maintained by using the matching circuit to minimize signal reflection. In order to get a wide bandwidth response, two hourglass shaped slots are used to couple the RF energy from the incoming signal and then transmit the amplified signal.

Figure 2:
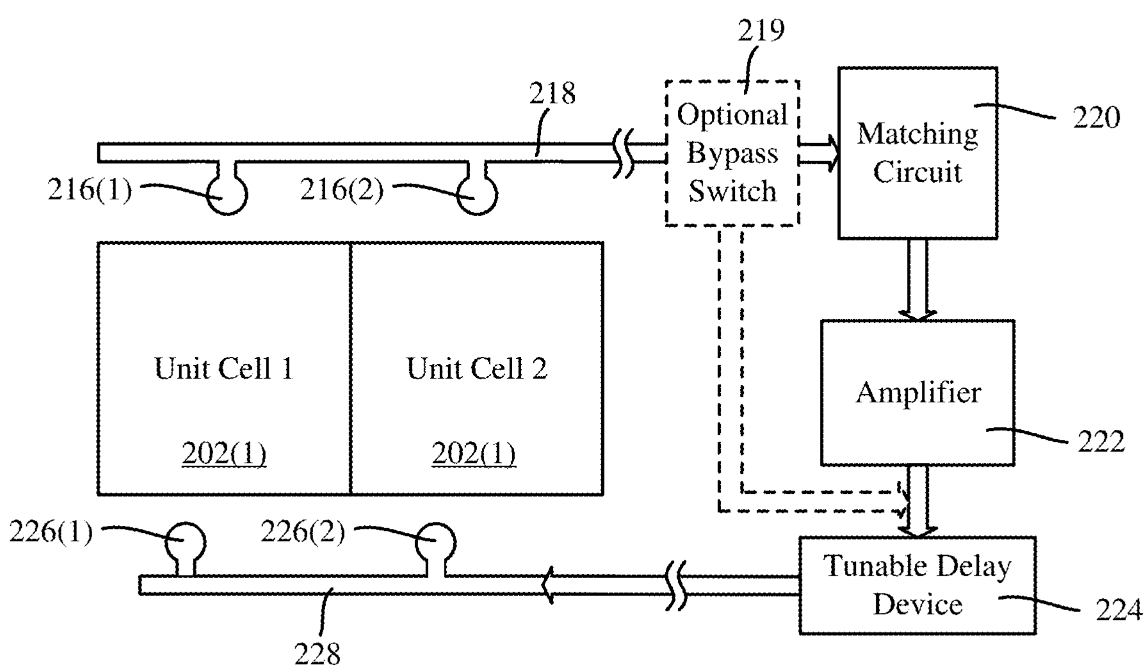
FIG. 2 is an example conceptual block diagram showing unit cells of a subarray of a reconfigurable intelligent surface that share circuitry for reflecting a selectively amplified and/or delayed incoming signal, in accordance with various example embodiments and implementations of the subject disclosure.

More particularly, FIG. 2 shows the concept of unit cells 202(1) and 202(2) sharing a matching circuit 220, power amplifier 222 and a tunable delay device 224. The first (incoming signal) microstrip line 218 has a contact/terminal 216(1) and 216(2) for the unit cells 202(1) and 202(2), respectively, to combine and couple the incoming signal to the shared matching circuit 220, power amplifier 222 and delay line 224. The amplified and delayed output signal of the shared matching circuit 220, power amplifier 222 and tunable delay device 224 is electrically coupled to the second microstrip line 228 which has a contact/terminal 226(1) and 226(2) for the unit cells 202(1) and 202(2), respectively, to divide couple the amplified and delayed signal to their respective metallic resonating patterns as generally described with reference to FIG. 1.

Further, FIG. 2 shows the concept of an optional bypass switch 219, which, for example, can be used to bypass amplification entirely. This can be useful when no amplification is needed, but the type of amplifier is one that does not pass the signal if turned off, or changes the signal strength too much when turned on to its lowest level. The tunable delay device 224 can also be bypassed, however this is generally not needed in one implementation, as one of the selected delay lines of the tunable delay device 224 can be internally designed to operate as a bypass switch when selected, as described herein.

Figure 3:
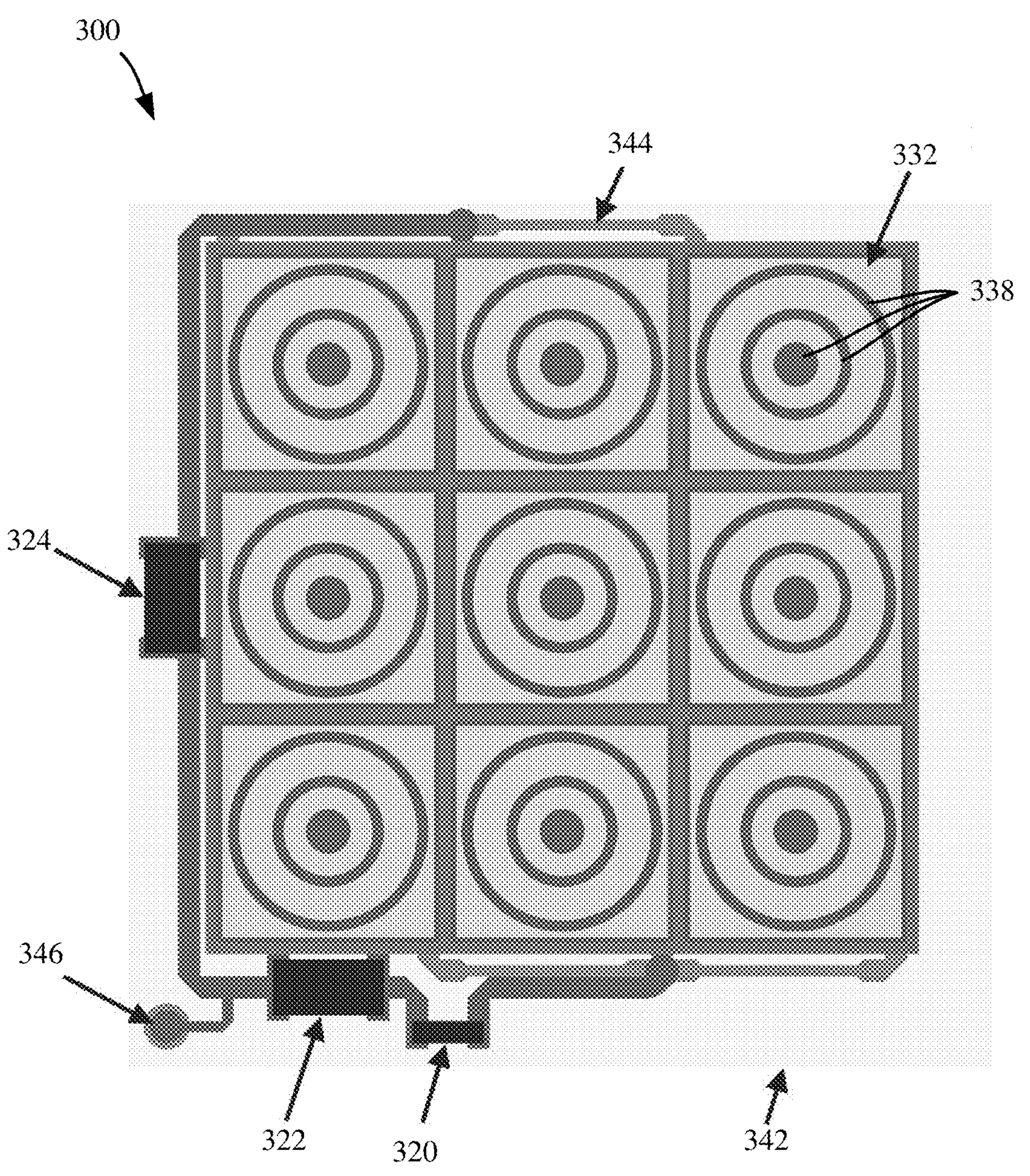
FIG. 3 is a top view representation of an example design of a subarray (subgroup) of unit cells that includes power amplifier circuitry and tunable delay circuitry on a dielectric substrate, in accordance with various example embodiments and implementations of the subject disclosure.
Figure 4:
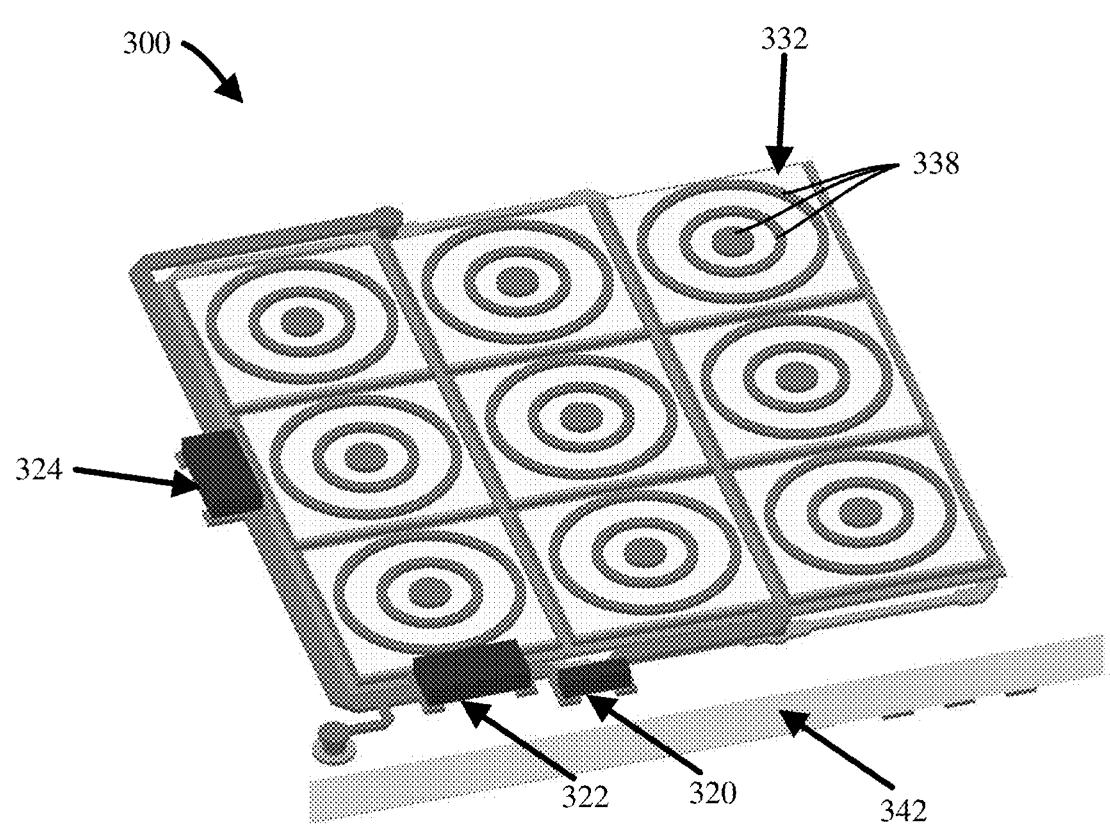
FIG. 4 is an isometric view representation of an example dynamic metasurface sub-array with nine unit-cells, a power amplifier, matching network, and a tunable delay between the send/return path, in accordance with various example embodiments and implementations of the subject disclosure.
Figure 5:
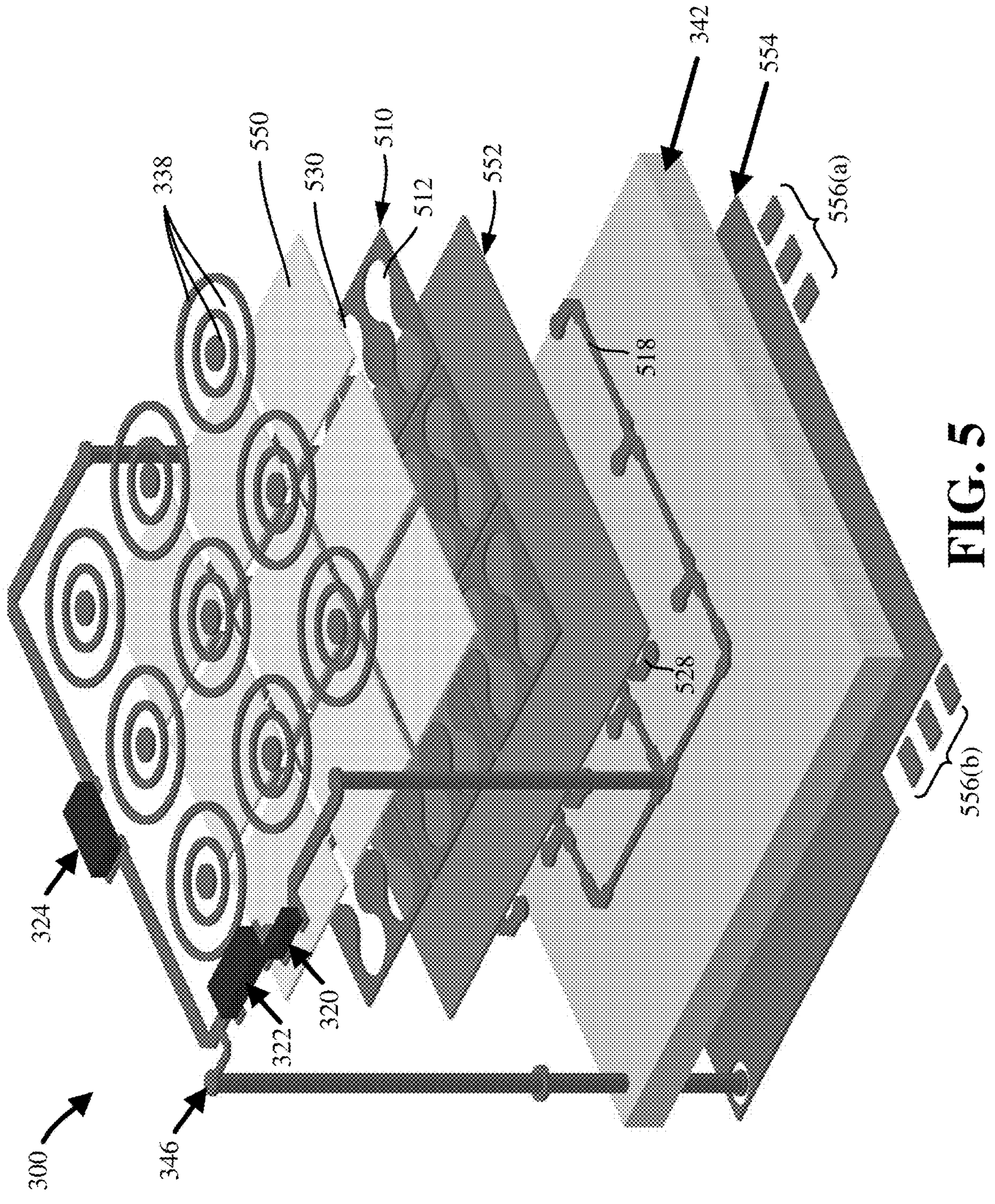
FIG. 5 is an exploded view representation of the example design of FIGS. 3 and 4 showing a stack of layers of the subarray, in accordance with various example embodiments and implementations of the subject disclosure.

FIGS. 3-5 show various two-dimensional and three-dimensional views of an example fabricated 3×3 subarray 300 of unit cells, including the resonating patterns of each unit cell. FIG. 3 shows a top-view representation of the subarray 300, FIG. 4 shows a three-dimensional perspective view of the subarray 300, and FIG. 5 shows an exploded view of the of the subarray 300.

In FIGS. 3-5, the resonating pattern 338 of metallic elements of concentric metallic rings of one unit cell 332 is labeled, with labels for the other resonating patterns of the other unit cells omitted for clarity. The unit-cells can be of any arbitrary shape as long as they resonate at the specified frequency of operation, e.g., 28 GHz in one example implementation. The unit cells rest on a dielectric substrate 342. The choice of substrate 342 can vary from a low-cost FR4 laminate, Rogers, alumina, quartz, or any other typically used substrate for multi-layer circuits. In one implementation used in simulations, the design used a low-cost FR4 substrate.

A matching network 320, a power amplifier 322, and a tunable delay element 324 are part of the subarray 300. Bias for the power amplifier can be provided via the terminal/contact 346 (over a via through the substrate); control signaling for the tunable delay element 324 can be provided below the switch through a via or the like (not explicitly shown). Each unit cell can include a variable capacitance device such as a varactor (FIG. 8) by which the phase of each unit cell can be controllably tuned; controlling the phases can result in constructive interference of the reflected signal from each unit cell, such as to change the combined signal's characteristics (e.g., reflected beam shape and direction). A microwave network 344 is formed by the microstrip lines and the matching network 320, power amplifier 322, and tunable delay element 324 circuitry as described with reference to FIGS. 1 and 2.

The exploded perspective view representation of FIG. 5 shows additional details of the example fabricated 3×3 subarray 300 of unit cells of FIGS. 3 and 4. The integrated design eliminates soldering multiple components for each unit-cell. Each power amplifier becomes the primary source of power usage, generates heat, increases the thermal noise floor, increase interferences, harmonic generation, requires a heatsink, and the like, which forfeits the purpose of low-cost metasurfaces concept in general. In the design described herein, the metasurface does not completely rely on the power amplifiers for amplification, but instead keeps the gain low enough, as it is used purely for boosting the processed signal, which already benefits from array gain.

In general, when signal is coupled through the (e.g., hourglass-shaped) couplers, in practice, the signal gets degraded, and a millimeter wave wireless signal moving through the layers and components can easily lose some amplitude. An integrated power amplifier helps recover the signal in conjunction with the typical array gain, without excessive heat generation and other interference/noise-related issues.

As shown in FIG. 5, an upper dielectric layer 550 beneath the resonating pattern (e.g., 338) of each unit cell is shown as separated from the other dielectric layers of other unit cells; however a single shared dielectric layer may be used. A separate upper dielectric layer for each unit cell facilitates separate fabrication of each unit cell. Another dielectric layer 552 insulates the slot layer 510 from the microstrip lines 518 and 528. The upper dielectric layer or layers are generally transparent to the frequency of the incoming and outgoing signals.

An interlayer via routes the received signal from the first microstrip line 518 to the surface mounted power amplifier 322. Another interlayer via routes the delayed and amplified signal from the second microstrip line 528 to the resonating patterns at the surface. Still other interlayer vias can be used for the DC power, e.g., to the varactors (FIG. 8), to the power amplifier bias terminal 346, and to the tunable delay element 324.

Beneath the substrate 342 is a bottom metallic layer 554; terminals 556(*a*) and 556(*b*) (as well as possibly others) can be used to couple the subarray 300 to other subarrays, and to the power amplifier bias control signal, the tunable delay device control signal, and to the varactors for bias control. A controller (FIG. 8) can be used to control the output signaling.

Figure 6:
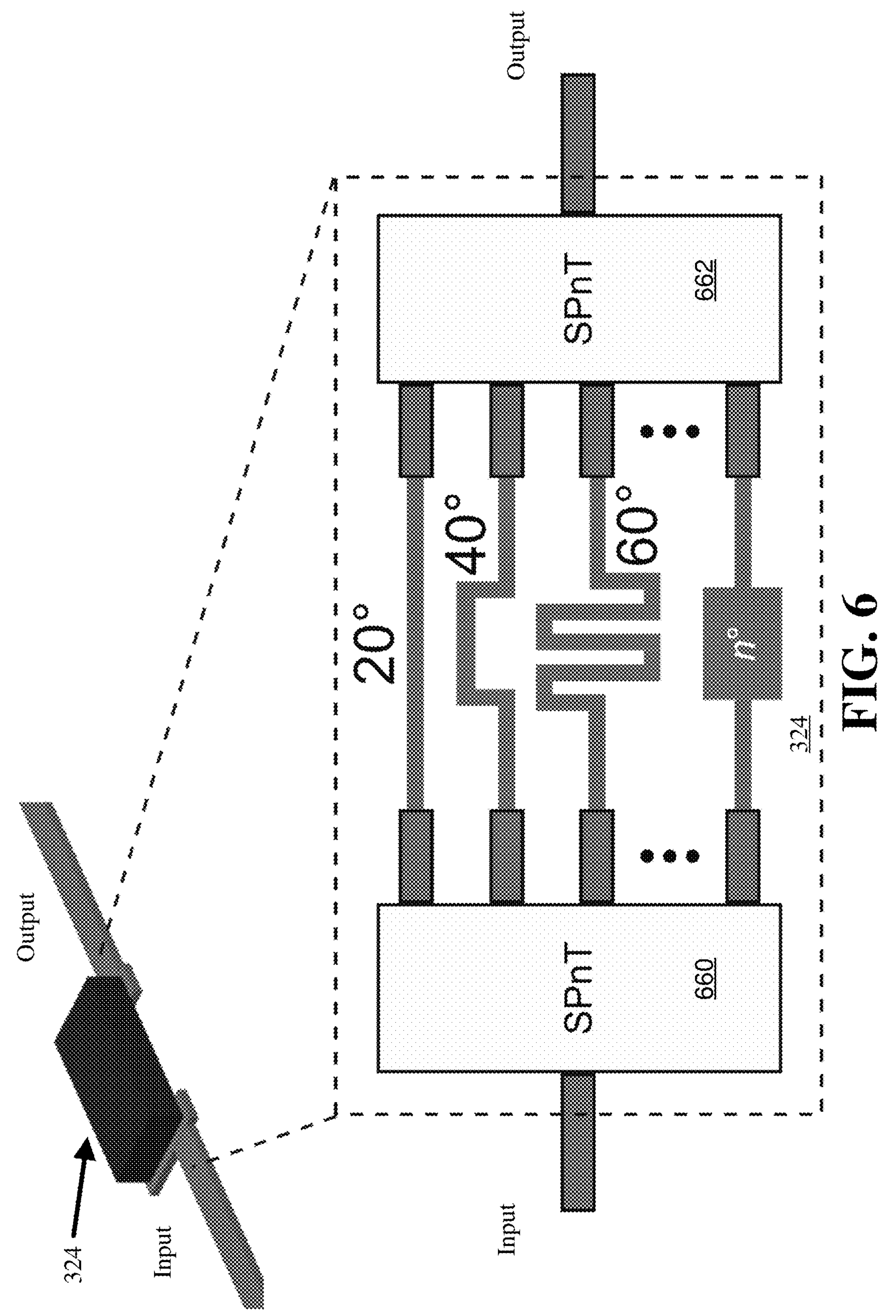
FIG. 6 is representation including an internal view of an example tunable delay device based on multi-port switches for selecting between different length of delay lines, in accordance with various example embodiments and implementations of the subject disclosure.

Internals of the tunable delay device 324 are shown in FIG. 6, in which two single-pole n-throw (SPnT) switches 660 and 662 are connected back-to-back, with various lengths of microstrip transmission lines between their respective contacts. For example, FIG. 6 shows that the reflected signal can be delayed by 20° steps, in a sequence such as 20°, 40°, 60°, to n°, depending on the number of total throws. Note that 20° is inherent in the example tunable delay device 324 of FIG. 6, that is, even if the delay line is short and straight as in FIG. 6, there is some delay; this however also occurs to an extent based on the length of the various conductive lines and vias between the components. Typically, SP8T switches can be used to accommodate eight different levels of delay in the reflected signal. The internals of the tunable delay device's delay network as depicted do not relying on commercial tunable delay circuits; rather this internal approach can be used to custom design the level of delay lines, and integrate these using multi-throw commercial switches heterogeneously.

To summarize, the sub-array dynamic metasurface shown in FIGS. 3-5 depict the internal layers and design concepts, in which the incoming signal, once received by the unit-cell arrays, is RF-coupled through the hourglass shaped couplers. The couplers are placed with a dielectric insulation layer, and are designed with maximum efficiency with a specified center frequency (e.g., of 28 GHz) similar to that of unit-cells. A design mismatch can cause issues with the signal going forward towards microwave circuit. It is also worth highlighting that the couplers need to be designed and a shape of the unit-cells need to be chosen such that the couplers should not act as a ground layer, but rather such that the openings, position, distance and the like of the coupler slots allows the signal to be almost completely absorbed or coupled with the bottom microwave circuit layer.

The coupled signal is picked up by the microwave circuit directly underneath the couplers' layer. The couplers and microwave circuitry are insulated by dielectric insulation. The microwave circuits has impedance matched T-shaped junctions to avoid any signal mismatch. The bottom metal layer under the substrate acts as a ground layer, and also has the (electrically insulated from ground) contact pads for connections, and to provide controlled bias to components such as power amplifiers and tunable delay devices. Interconnects are shown in FIG. 5 to highlight connections between the layers. This design allows reverse connection of the power amplifier and matching circuit to accommodate delay either before the power amplifier or after the power amplifier. This design only has four metal layers, thus reducing the manufacturing costs significantly.

Turning to another concept, described herein is a hardware approach to estimate the angle of arrival of an incoming wireless signal illuminating (impinging on) the metasurface panel. This is included with the integrated solution of processing the signal, and operates without disrupting the reflected signal reflecting off the panel as also described herein, that is, by the integration of the hourglass shape static couplers beneath the unit-cells, followed by microwave processing circuitry to amplify the reflected signal and/or to add a tunable delay before transmitting the processed signal in the same polarization as of the incoming signal.

To this end, when an incoming millimeter-wave (mmWave) wireless signal impinges on the panel, one step can be to estimate the angle of arrival (AoA) of the signal. Note that while the base station position is fixed and thus the AoA for signals transmitted therefrom is already predetermined, user equipment (UEs) are not fixed and often movable. Thus, to establish a return path, a signal from a mobile UE towards a base station with an in-between metasurface makes the AoA variable.

Figure 7:
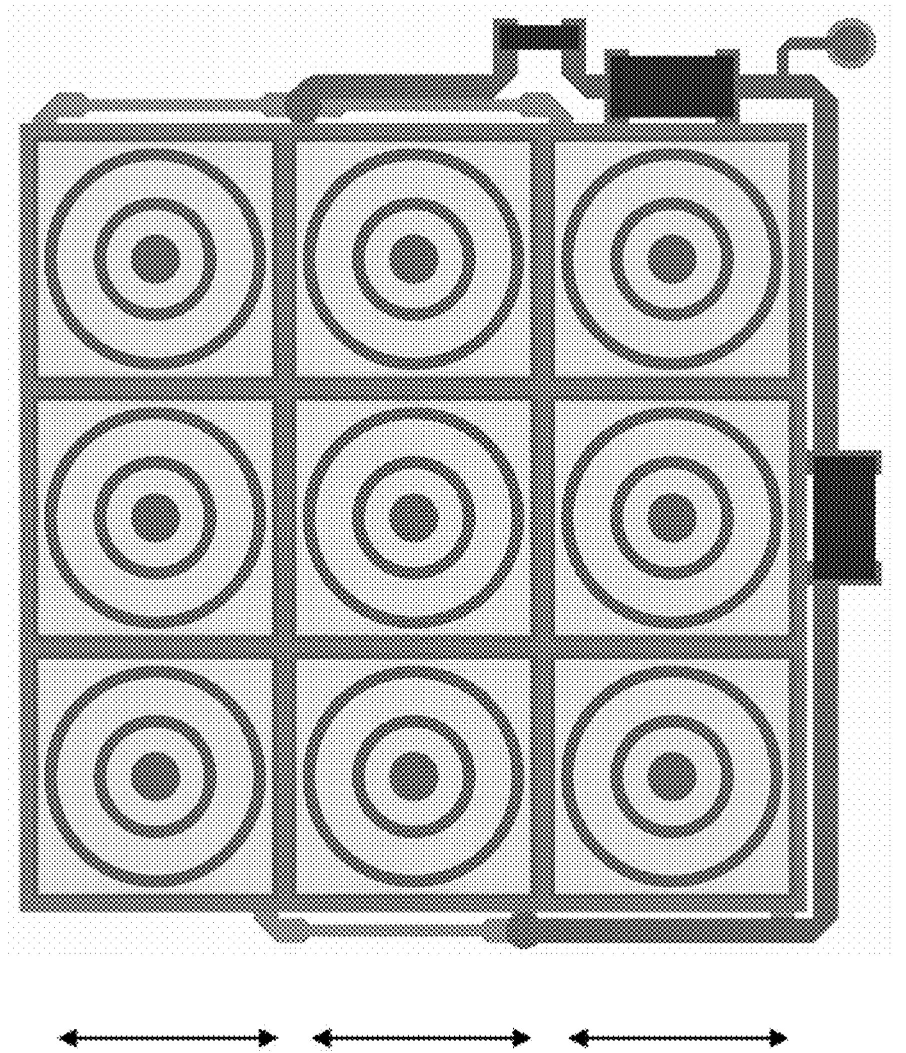
FIG. 7 is a top view representation of an example subarray of unit cells showing delay determination between consecutive unit cells to facilitate estimation of the angle of arrival of an incoming signal, in accordance with various example embodiments and implementations of the subject disclosure.
Figure 12:
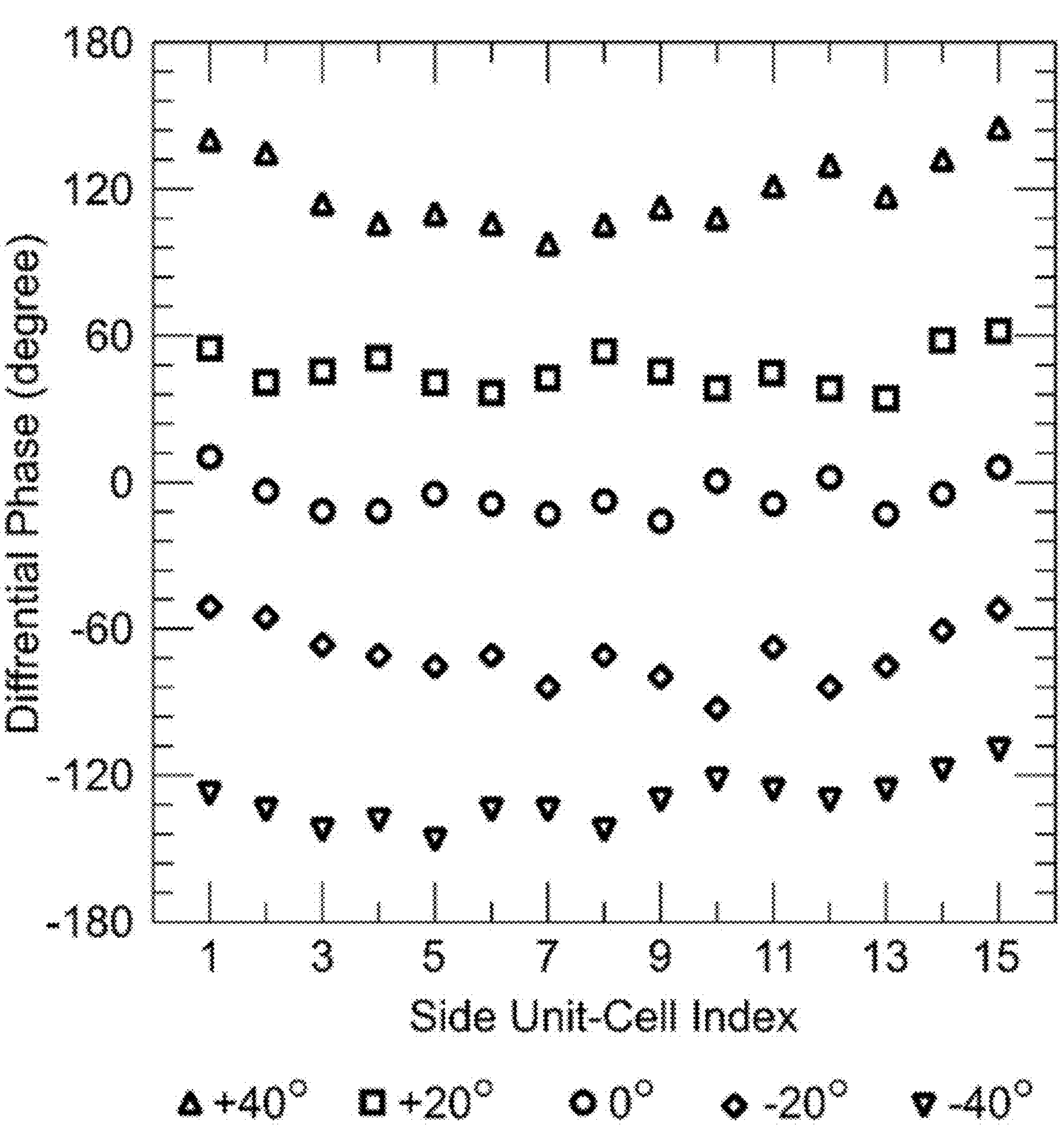
FIG. 12 is a graphical representation showing an example of differential phase values experienced by unit cells elements along a 16×1 array of elements of a reconfigurable intelligent surface for incoming signals with different angles of arrival, in accordance with various example embodiments and implementations of the subject disclosure.

The AoA can be estimated by computing the delay between unit-cells, typically consecutive unit cells either in a row or a column. In general, the beam width is large enough to illuminate the whole panel, and a panel size can include hundreds of unit-cells or multiple subarrays. Delay can be estimated by studying the $S_{11}$ (reflection coefficient) of the incoming signal as described herein; note that S-parameters are commonly used in RF and microwave systems. A microwave processing circuit embedded in each sub-array allows precisely capturing the $S_{11}$. When estimating the delay between two consecutive cells, a time differential $\delta d$ is added because the position of the unit-cells are at a certain known (defined during design) distance as shown in FIG. 7, typically in the sub-wavelength regime. These time differential data are associated with phase differential data, which for a row or column of unit cells generally align with one another based on the angle of arrival (FIG. 12).

Figure 8:
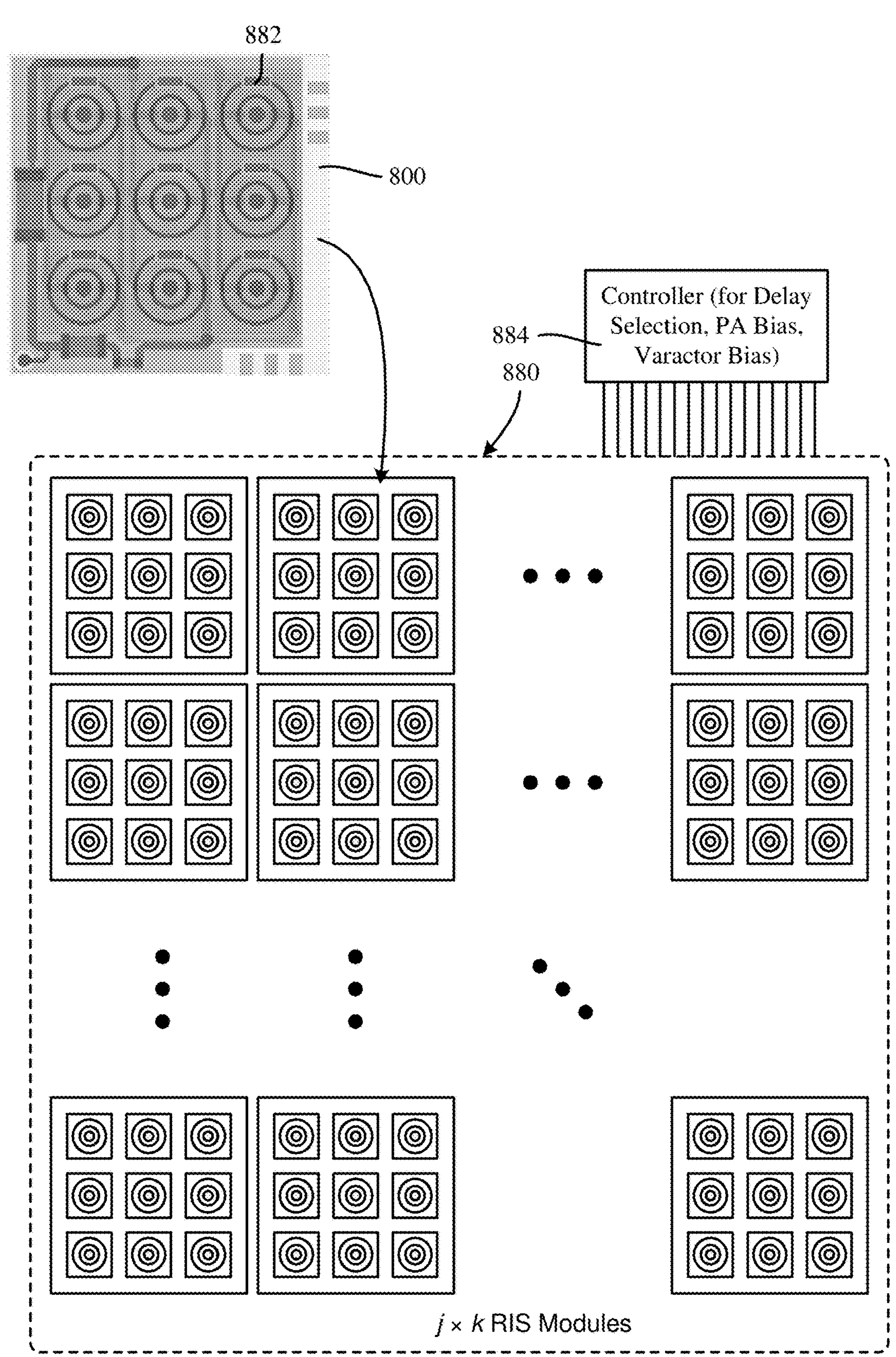
FIG. 8 is a top view representation showing how subarrays of unit cells can be combined into a reconfigurable intelligent surface, in accordance with various example embodiments and implementations of the subject disclosure.

FIG. 8 shows how a subarray 800 can be incorporated with other subarrays (j×k RIS modules) into a reconfigurable intelligent surface (RIS) 880. Note that the enlarged portion showing the subarray 880 also shows varactors (or other tuning devices) integrated with each unit cell, e.g., as small rectangles in FIG. 8. One such varactor 882 is labeled in FIG. 8, with the other varactors not labeled for purposes of clarity.

A controller 884 is coupled to the reconfigurable intelligent surface 880, which outputs control signals for delay selection, power amplifier (PA) bias, and varactor bias to the components of the subarrays. The controller 884 can act on feedback from the base station and/or UEs, such as to determine whether to boost the signal, whether to change the delay, and how to reshape and/or change the direction of the reflected signal. The controller 884 also can determine the angle of arrival of the incoming signal.

Figure 9:
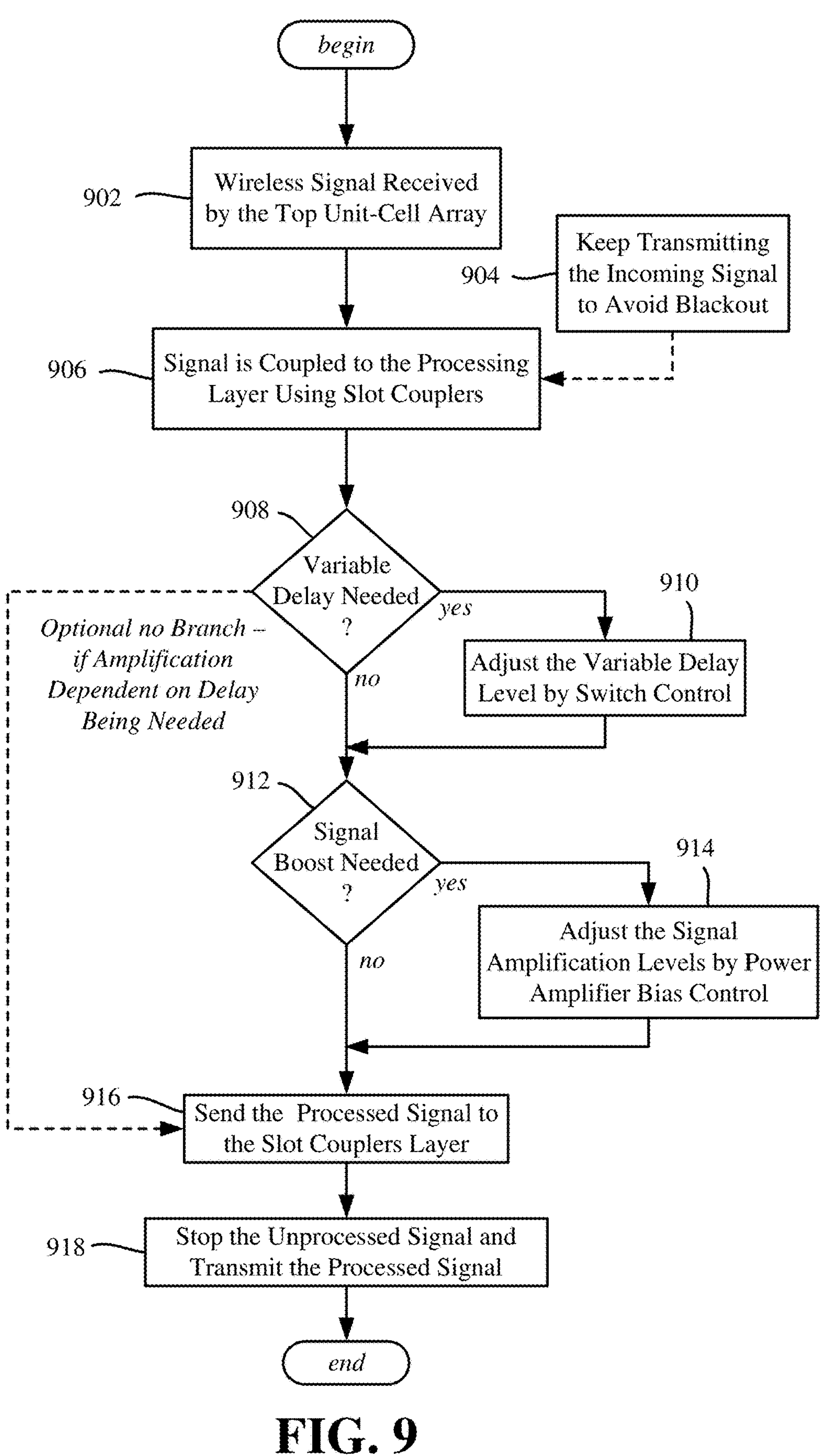
FIG. 9 is a flow diagram showing example operations related to selectively controlling delay and/or selectively controlling power amplification to a reflected instance of an incoming signal, in accordance with various example embodiments and implementations of the subject disclosure.

A full working principle of the technology described herein is described with reference to the flow diagram of FIG. 9, beginning at operation 902 which represents the incoming signal being received by the metasurface. Note that the signal continues being transmitted (operation 904) to avoid blackout.

As described herein, the signal is RF-coupled to the processing layer via the slot couplers. If variable delay is needed (e.g., as specified by feedback or control information to the controller) as evaluated at operation 908, operation 910 adjusts the variable delay level by switch control as specified; if no additional delay is needed, the switches remain in the state corresponding to the most direct path (e.g., the 20° line in FIG. 6, although a separate bypass switch as in FIG. 2 is feasible). Similarly, if signal boost is needed, (e.g., as similar specified by feedback or control information to the controller) as evaluated at operation 912, operation 914 adjusts the signal amplification level by bias control as specified. Note that it is feasible to have an implementation in which amplification is needed only if some additional delay is selected, whereby operation 908 can instead branch directly to operation 916.

Operation 916 represents sending the processed signal to the slot couplers layer, that is, for RF coupling back to the resonating patterns. At this point, as represented by operation 918, the unprocessed signal is stopped, and the processed signal is transmitted (e.g., reflected) by the metasurface.

Figure 10:
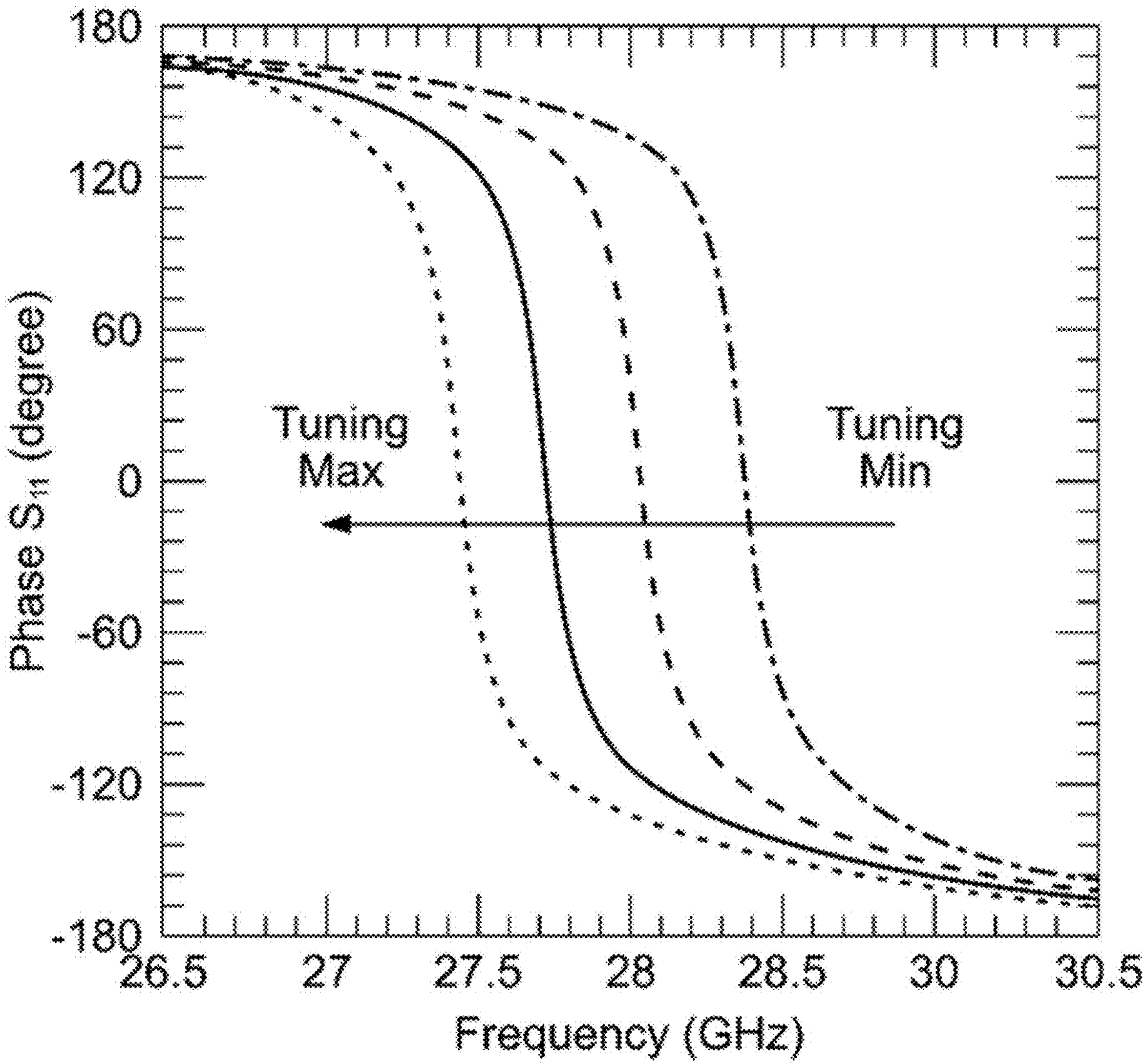
FIG. 10 is a graphical representation of phase of a reflected signal around the operational frequency of 28 GHz, as varied with the change in capacitance of varactors, in accordance with various example embodiments and implementations of the subject disclosure.
Figure 11:
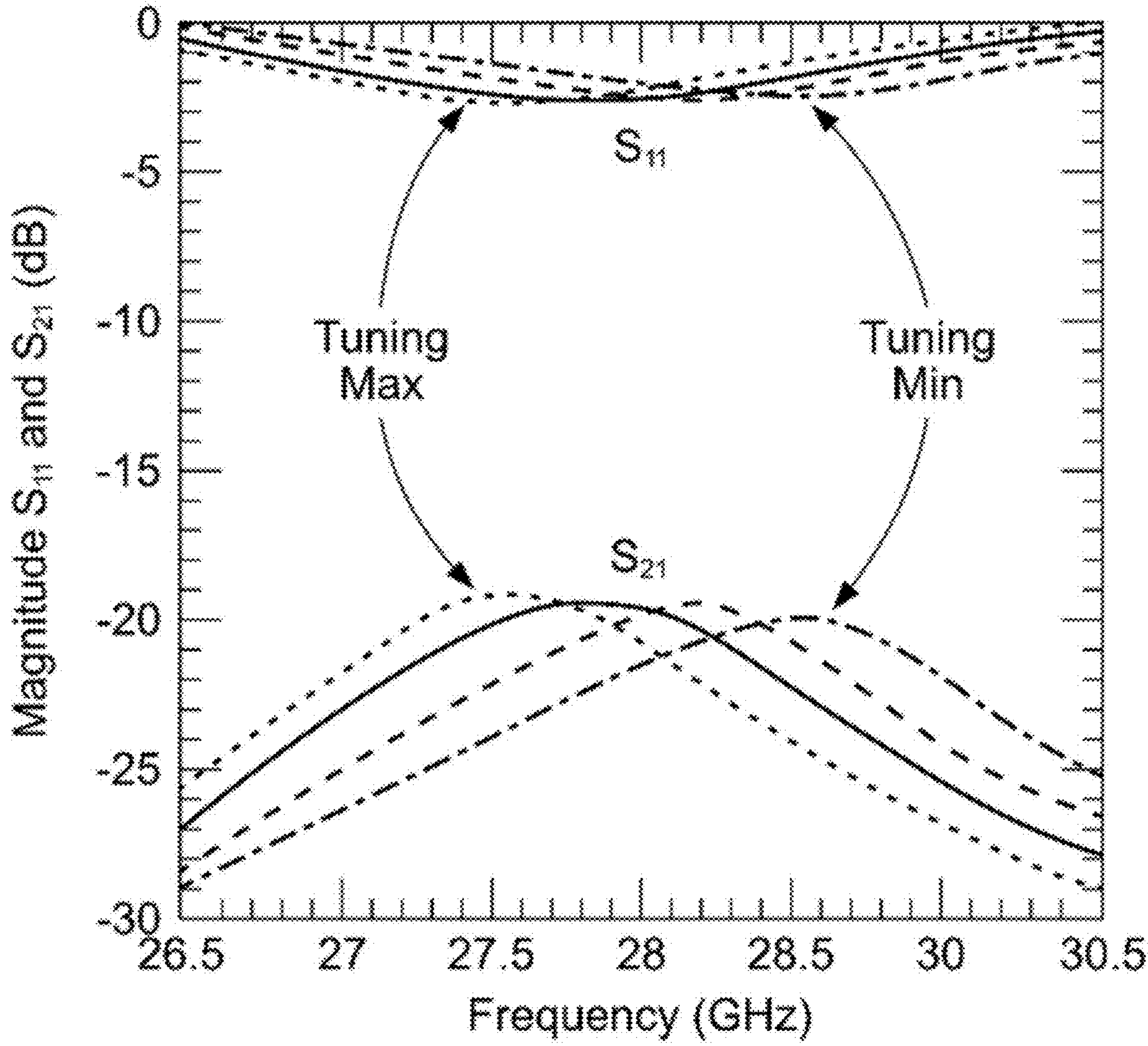
FIG. 11 is a graphical representation of the magnitude of the reflected signal for different varactor capacitances, in accordance with various example embodiments and implementations of the subject disclosure.

FIGS. 10 and 11 show the full-field 3D electromagnetic (EM) response highlighting operating region between 27.5 to 28.5 GHz. The simulation results shown in FIGS. 10 and 11 validate the operation of metasurface module by showing minimum and maximum tuning range (e.g., when varactor-based tuning is provided), with 28 GHz center frequency and 1 GHz of operational bandwidth. The magnitude of the signal reflecting from the unit-cells, and coupled energy at the bottom of the cells is shown in FIGS. 10 and 11 as well. As can be seen, there is at least 15 dB difference in the reflecting signal and transmitting signal to avoid any interference. The simulations were carried out using an industry standard full-wave 3D finite element modeler used for EM designs.

Figure 13:
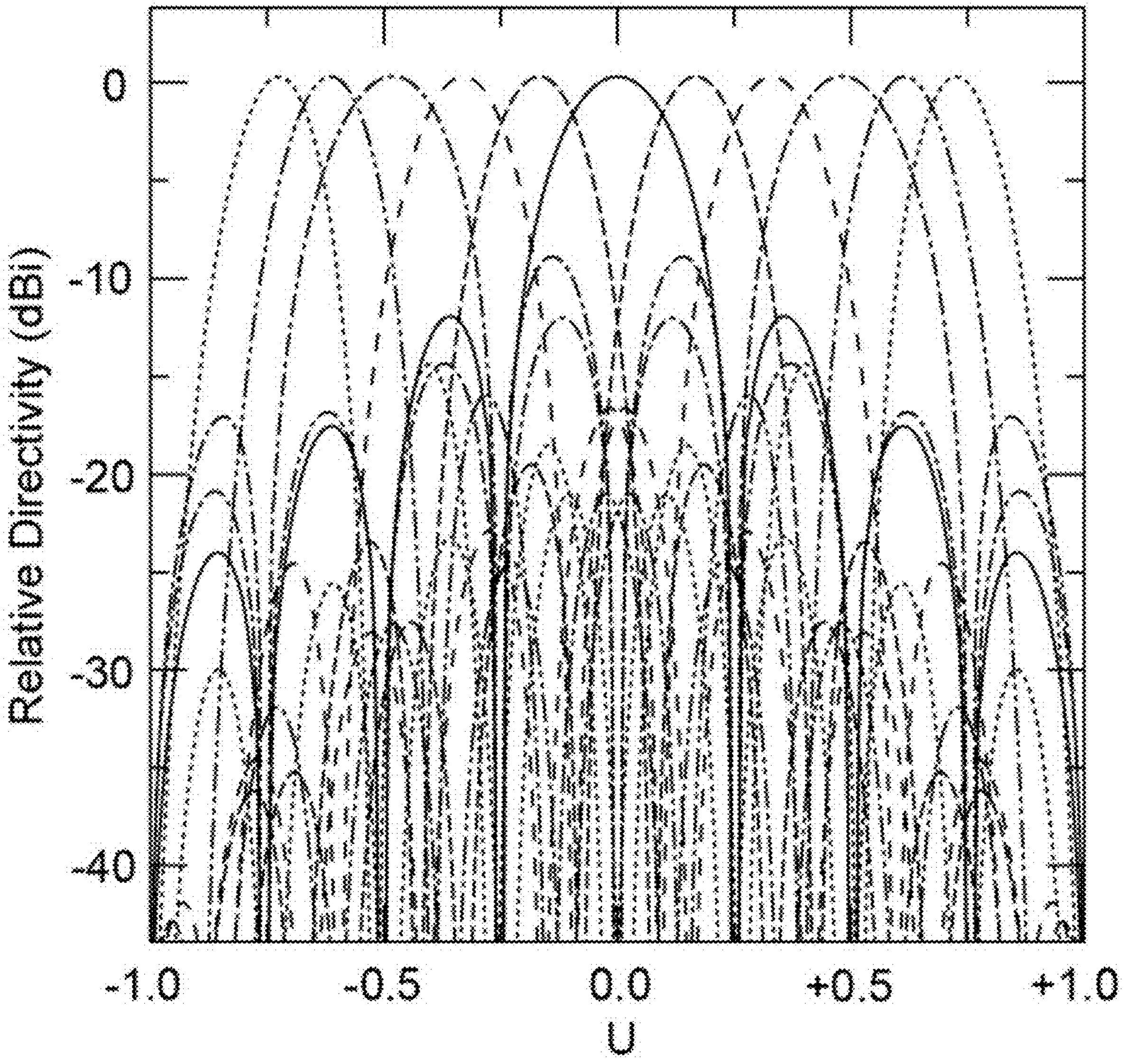
FIG. 13 is an example diagram showing the relative directivity corresponding to a reconfigurable intelligent surface configuration (with 64 unit cells), in accordance with various embodiments and implementations of the subject disclosure.

FIGS. 12 and 13 also show the full-field 3D EM response with respect to how differential phase (in degrees) can be used to estimate the angle of arrival (AoA) as shown in FIG. 12. More particularly, the response of AoA estimation using differential delay is shown in FIG. 12 for different incoming signals illuminating the panel from +40° to −40° in 20° step-size increments. It is seen that it the differential delay response between pairs of consecutive cells (e.g., the 15 indexes represents the differences between the time delay at sixteen pairs of adjacent cells) tend to align along the same differential phase value, which corresponds to the estimated angle of arrival. Note that this is not a perfectly precise analog method, but works well at reasonably quantized levels, such as every 20° or 15° step size in angles of arrival. This can be further tweaked by placing the unit-cells at closer proximity by reducing the wavelength.

When tuning is provided, the reflected beam or angle of departure (AoD) can be steered in a direction of choice, as shown in the simulation response of relative directivity (dBi) in FIG. 13 for a 64 cell metasurface. The relative response is chosen for the graph because of the large number of datasets, and to highlight the clear steering patterns.

One or more example embodiments can be embodied in a system, such as described and represented herein. The system can include a subgroup of a group of unit cells of a reconfigurable intelligent surface, the subgroup electrically coupled to a power amplifier and tunable delay device shared by the subgroup. The subgroup can be configured to receive an electromagnetic signal having a polarization to obtain a received electromagnetic signal, and couple the received electromagnetic signal to a first microstrip line electrically coupled to the power amplifier to input the received electromagnetic signal to the power amplifier. The subgroup can be further configured to selectively amplify the received electromagnetic signal to output a selectively amplified electromagnetic signal to the tunable delay device, to output a selectively amplified and delayed signal to a second microstrip line electrically coupled to the tunable delay device, the selectively amplified and delayed electromagnetic signal having a same polarization as the polarization of the received electromagnetic signal, and couple the selectively amplified and delayed electromagnetic signal from the second microstrip line to respective resonating metallic portions of respective unit cells of the subgroup, to combine and redirect the selectively amplified and delayed electromagnetic signal from the subgroup.

The tunable delay device can include controllable switches that select among different length delay lines based on a control signal.

The group of unit cells can be separated from one another by defined distances that facilitate determination of an angle of arrival of the received electromagnetic signal based on time differential data that is associated with differential phase data corresponding to the angle of arrival.

The respective unit cells of the subgroup can couple the received electromagnetic signal to the first microstrip line via first respective openings of a slotted plane layer, and wherein the respective unit cells of the subgroup couple the amplified and delayed electromagnetic signal to the respective resonating metallic portions via second respective openings of the slotted plane layer. The first respective openings and the second respective openings can be hourglass shaped. The first respective openings and second respective openings can be sized to correspond to a resonating frequency of the respective resonating metallic portions.

The power amplifier can be selectively controlled to adjust a signal amplification level applied via a power amplifier bias control.

The system further can include an impedance matching circuit coupled to the power amplifier.

The subgroup can include a two-dimensional array of the respective unit cells. The two-dimensional array can include: four unit cells arranged as two unit cells by two unit cells, nine unit cells arranged as three unit cells by three unit cells, sixteen unit cells arranged as four unit cells by four unit cells, or twenty-five unit cells arranged as five unit cells by five unit cells. The two-dimensional array can include a first number of unit cells in a first dimension that does not equal a second number of unit cells in a second dimension.

One or more example embodiments can be embodied in a unit cell, such as described and represented herein. The unit cell can include a resonating metallic portion, and a slotted plane, which can include a first opening configured to pass an impinging electromagnetic wave to a first microstrip line coupled to the unit cell. The unit cell can be coupled to a power amplifier that amplifies the impinging electromagnetic wave into an amplified electromagnetic wave, and a tunable delay device that adds a delay to the amplified electromagnetic wave to output an amplified and delayed electromagnetic wave to a second microstrip line coupled to the unit cell. The slotted plane further can include a second opening configured to pass the amplified and delayed electromagnetic wave from the second microstrip line to the resonating metallic portion to redirect the amplified and delayed electromagnetic wave as a reflected selectively amplified and delayed electromagnetic wave.

The unit cell can be a first unit cell, the reflected amplified and delayed electromagnetic wave can include a first instance of the reflected amplified and delayed electromagnetic wave from the first unit cell, the first unit cell can be coupled to a second unit cell by the first microstrip line to share the power amplifier and the tunable delay device, and to the second microstrip line, and the reflected amplified and delayed electromagnetic wave can include a second instance of the reflected amplified and delayed electromagnetic wave from the second unit cell that combines with the first instance of the reflected amplified electromagnetic wave from the first unit cell. The first unit cell can be separated from the second unit cell by a defined distance that facilitates determination of an angle of arrival of the impinging electromagnetic wave.

The tunable delay device can include controllable switches that are controlled to select among respective different length delay lines corresponding to respective different delay amounts.

One or more example embodiments can be embodied in a device, such as described and represented herein. The device can include a group of unit cells of a reconfigurable intelligent surface; the group of unit cells can be electrically coupled to signal processing circuitry shared by the group, and the signal processing circuitry can include a power amplifier and a tunable delay device. Each unit cell of the group of unit cells can include a respective resonating metallic pattern corresponding to a respective resonating frequency, and a respective slotted plane comprising a respective first opening that passes impinging electromagnetic signals to a first contact of a first microstrip line. The first microstrip line can be electrically coupled to an input of the signal processing circuitry to obtain processed electromagnetic signals comprising at least one of: amplified electromagnetic signals, or delayed electromagnetic signals, and an output of the signal processing circuitry coupled to a second contact of a second microstrip line that passes the processed electromagnetic signals through a respective second opening of the respective slotted plane to the respective resonating metallic pattern to redirect the impinging electromagnetic signals as respective processed electromagnetic signals.

The group of unit cells can include a row of unit cells or a column of unit cells separated from one another by defined distances that facilitate determination of an angle of arrival of the impinging electromagnetic signals.

The group can include a first subgroup arranged as a first modular array of the respective unit cells that can be configured to couple to a second subgroup arranged as a second modular array of the reconfigurable intelligent surface.

The tunable delay device can include controllable switches that are controlled by a controller to select among respective different length delay lines corresponding to respective different delay amounts for the delayed electromagnetic signals.

The controller can control the power amplifier to determine an amplification level of the power amplifier from among different available amplification levels, and the signal processing circuitry can include an impedance matching circuit.

As can be seen, the technology described herein is directed to a device for receiving and reflecting an electromagnetic signal, which can be in the same polarization, by first coupling the RF energy, impedance matching processing, amplifying, and using a delay circuit (e.g., switch-based), e.g., so as to not create unwanted harmonics while amplifying the signal without breaking the signal link. The seamless monolithic integration of both the dividing and combining circuits (two separate microstrip lines), along with the power supply circuitry, results in a streamlined and organized design. Further, the design facilitates the use of only one power amplifier per m×n subarray of the surface's elements, which provides a significant decrease (e.g., 9 times for a 3×3 subarray) in the power amplifier power requirements, significantly reducing the cost, power, heat, and interference. Still further, the angle of arrival of the incoming signal can be passively determined. The described design achieves a balance between reduced costs, added functionality and system complexity, ensuring that the incorporation of power amplifiers and tunable delay into the reconfigurable intelligent surface architecture does not overly complicate the system.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

a subgroup of a group of unit cells of a reconfigurable intelligent surface, the subgroup electrically coupled to a power amplifier and tunable delay device shared by the subgroup, the subgroup configured to:

receive an electromagnetic signal having a polarization to obtain a received electromagnetic signal;

couple the received electromagnetic signal to a first microstrip line electrically coupled to the power amplifier to input the received electromagnetic signal to the power amplifier;

selectively amplify the received electromagnetic signal to output a selectively amplified electromagnetic signal to the tunable delay device, to output a selectively amplified and delayed signal to a second microstrip line electrically coupled to the tunable delay device, the selectively amplified and delayed electromagnetic signal having a same polarization as the polarization of the received electromagnetic signal; and couple the selectively amplified and delayed electromagnetic signal from the second microstrip line to respective resonating metallic portions of respective unit cells of the subgroup, to combine and redirect the selectively amplified and delayed electromagnetic signal from the subgroup.

2. The system of claim 1, wherein the tunable delay device comprises controllable switches that select among different length delay lines based on a control signal.

3. The system of claim 1, wherein the group of unit cells are separated from one another by defined distances that facilitate determination of an angle of arrival of the received electromagnetic signal based on time differential data that is associated with differential phase data corresponding to the angle of arrival.

4. The system of claim 1, wherein the respective unit cells of the subgroup couple the received electromagnetic signal to the first microstrip line via first respective openings of a slotted plane layer, and wherein the respective unit cells of the subgroup couple the amplified and delayed electromagnetic signal to the respective resonating metallic portions via second respective openings of the slotted plane layer.

5. The system of claim 4, wherein the first respective openings and the second respective openings are hourglass shaped.

6. The system of claim 4, wherein the first respective openings and second respective openings are sized to correspond to a resonating frequency of the respective resonating metallic portions.

7. The system of claim 1, wherein the power amplifier is selectively controlled to adjust a signal amplification level applied via a power amplifier bias control.

8. The system of claim 1, further comprising an impedance matching circuit coupled to the power amplifier.

9. The system of claim 1, wherein the subgroup comprises a two-dimensional array of the respective unit cells.

10. The system of claim 9, wherein the two-dimensional array comprises: four unit cells arranged as two unit cells by two unit cells, nine unit cells arranged as three unit cells by three unit cells, sixteen unit cells arranged as four unit cells by four unit cells, or twenty-five unit cells arranged as five unit cells by five unit cells.

11. The system of claim 9, wherein the two-dimensional array comprises a first number of unit cells in a first dimension that does not equal a second number of unit cells in a second dimension.

12. A unit cell, comprising:

a resonating metallic portion; and a slotted plane comprising a first opening configured to pass an impinging electromagnetic wave to a first microstrip line coupled to the unit cell, the unit cell coupled to:

a power amplifier that amplifies the impinging electromagnetic wave into an amplified electromagnetic wave, and a tunable delay device that adds a delay to the amplified electromagnetic wave to output an amplified and delayed electromagnetic wave to a second microstrip line coupled to the unit cell, wherein the slotted plane further comprises a second opening configured to pass the amplified and delayed electromagnetic wave from the second microstrip line to the resonating metallic portion to redirect the amplified and delayed electromagnetic wave as a reflected selectively amplified and delayed electromagnetic wave.

13. The unit cell of claim 12, wherein the unit cell is a first unit cell, wherein the reflected amplified and delayed electromagnetic wave comprises a first instance of the reflected amplified and delayed electromagnetic wave from the first unit cell, wherein the first unit cell is coupled to a second unit cell by the first microstrip line to share the power amplifier and the tunable delay device, and to the second microstrip line, and wherein the reflected amplified and delayed electromagnetic wave comprises a second instance of the reflected amplified and delayed electromagnetic wave from the second unit cell that combines with the first instance of the reflected amplified electromagnetic wave from the first unit cell.

14. The unit cell of claim 13, wherein the first unit cell is separated from the second unit cell by a defined distance that facilitates determination of an angle of arrival of the impinging electromagnetic wave.

15. The unit cell of claim 12, wherein the tunable delay device comprises controllable switches that are controlled to select among respective different length delay lines corresponding to respective different delay amounts.

16. A device, comprising:

a group of unit cells of a reconfigurable intelligent surface, the group of unit cells electrically coupled to signal processing circuitry shared by the group, the signal processing circuitry comprising a power amplifier and a tunable delay device; and each unit cell of the group of unit cells comprising:

a respective resonating metallic pattern corresponding to a respective resonating frequency; and a respective slotted plane comprising a respective first opening that passes impinging electromagnetic signals to a first contact of a first microstrip line, the first microstrip line electrically coupled to:

an input of the signal processing circuitry to obtain processed electromagnetic signals comprising at least one of: amplified electromagnetic signals, or delayed electromagnetic signals, and an output of the signal processing circuitry coupled to a second contact of a second microstrip line that passes the processed electromagnetic signals through a respective second opening of the respective slotted plane to the respective resonating metallic pattern to redirect the impinging electromagnetic signals as respective processed electromagnetic signals.

17. The device of claim 16, wherein the group of unit cells comprises a row of unit cells or a column of unit cells separated from one another by defined distances that facilitate determination of an angle of arrival of the impinging electromagnetic signals.

18. The device of claim 16, wherein the group comprises a first subgroup arranged as a first modular array of the respective unit cells that is configured to couple to a second subgroup arranged as a second modular array of the reconfigurable intelligent surface.

19. The device of claim 16, wherein the tunable delay device comprises controllable switches that are controlled by a controller to select among respective different length delay lines corresponding to respective different delay amounts for the delayed electromagnetic signals.

20. The device of claim 19, wherein the controller controls the power amplifier to determine an amplification level of the power amplifier from among different available amplification levels, and wherein the signal processing circuitry comprises an impedance matching circuit.

* * * * *